United States Patent [19]

Komatsu

[11] Patent Number: 4,922,358
[45] Date of Patent: May 1, 1990

[54] DOUBLE-CASSETTE TAPE PLAYER
[75] Inventor: Norimasa Komatsu, Kakuda, Japan
[73] Assignee: Alps Electric Co., Ltd., Tokyo, Japan
[21] Appl. No.: 213,397
[22] Filed: Jun. 30, 1988
[30] Foreign Application Priority Data Oct. 26, 1987 [JP] Japan .................................. 62-271255
Oct. 26, 1987 [JP] Japan .................................. 62-271256

[51] Int. Cl.⁵ ........................ G11B 15/68; G11B 5/54
[52] U.S. Cl. ..................................... 360/105; 360/92; 379/83; 242/200
[58] Field of Search ................. 360/91, 92, 96.1–96.4, 360/105; 242/199–200; 379/83

[56] References Cited

U.S. PATENT DOCUMENTS

| | | | |
|---|---|---|---|
| 4,114,834 | 9/1978 | Haake | 242/200 |
| 4,385,205 | 5/1983 | Jacobson | 379/83 |
| 4,563,711 | 1/1986 | Takai | 242/208 |
| 4,584,435 | 4/1986 | Jacobson | 379/83 |
| 4,612,590 | 9/1986 | Kurosawa | 360/91 |
| 4,777,547 | 10/1988 | Kikuchi et al. | 360/92 |

Primary Examiner—John H. Wolff
Attorney, Agent, or Firm—Guy W. Shoup; Paul J. Winters

[57] ABSTRACT

In a double-cassette tape player for driving cassette tapes in a pair of cassettes in an alternative fashion, there is provided a mechanism for moving a single head base to respective positions of the cassettes by a single drive source, a mode detector for detecting that the head base moves in a first direction toward one of cassette receiving areas before taking a regular position in a second direction, and an error preventing apparatus responsive to a detection output from the mode detector to bring the head base to the regular position.

2 Claims, 12 Drawing Sheets

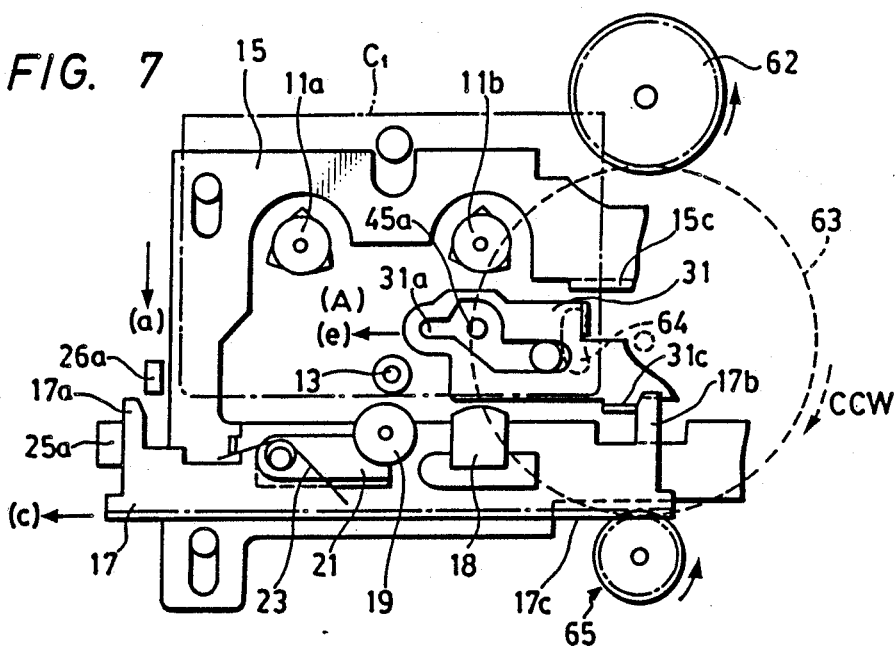
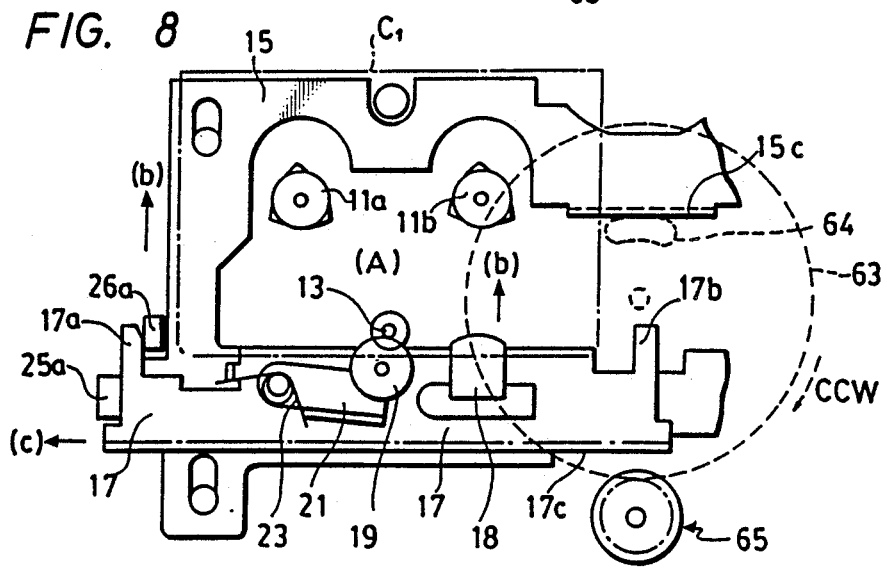

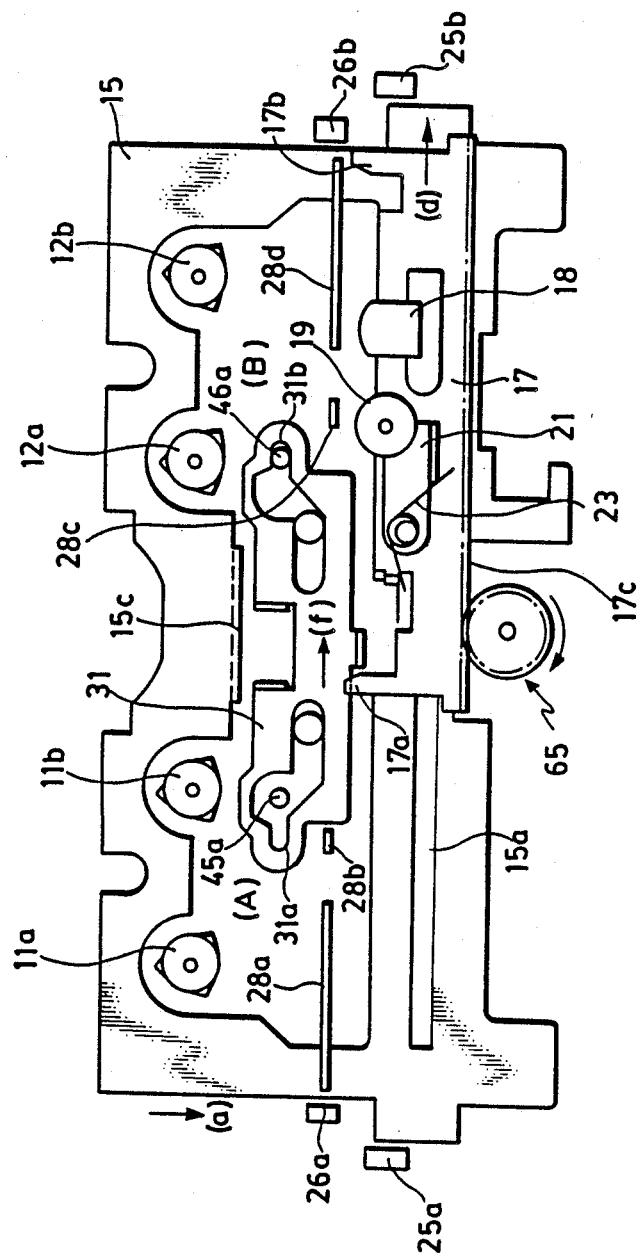

DOUBLE-CASSETTE TAPE PLAYER

FIELD OF THE INVENTION

This invention relates to a double-cassette tape player used in an automatic telephone answer apparatus, etc. and having a pair of cassette tapes activated in an alternative fashion, and relates more particularly to a mode detecting device used in a mechanism configured to move a single head base to respective positions of a pair of cassettes by a single driving source in order to detect the correct and precise position of the head base, and further relates to an error preventing device used in the same mechanism to detect an error movement of the system toward one of cassette receiving areas before arrival of the head base at a proper position due to a detection error of the detector or other reason and restore the preceding configuration of the mechanism.

BACKGROUND OF THE INVENTION AND OBJECTS OF THE INVENTION

In most double-cassette tape players used in automatic telephone answer apparatuses, cassettes loaded therein are driven selectively so as to use one of the reproduce an automatic answer message and the other to record and reproduce messages of telephone calls.

Most prior art driving units for use in a double-cassette tape player in a telephone answering apparatus include a pair of driving units each loaded with each of a pair cassette halves and each including reel bases, a capstan rotatably driven at a constant speed, a pinch roller compressing a tape to the capstan to drive it, and a magnetic head associated with each cassette In such a double-cassette tape player, however, when used in a telephone answering apparatus, respective cassette loading units are driven selectively and not simultaneously, and only one set of amplifier is provided in most cases. Therefore, in order to balance the reproduced sound volumes, etc. of two cassettes, it is necessary to carefully select two magnetic heads not largely different in their characteristics before incorporating them into the unit. This invites some difficulties in magnetic head selecting and assembling processes. Further, the use of two magnetic heads in a single unit results in an increase of parts and the manufacturing cost.

If a single magnetic head can be used commonly for a pair of cassettes, this leads to a reduction of the number of the magnetic heads and alleviates such a process of selecting magnetic heads. In order to use a single magnetic head for both cassettes, however, it is necessary to move the single magnetic head selectively to tape exposed portions of a pair of cassettes and further to positions for contact with magnetic tapes in the cassettes. Therefore, a driving unit using a single head for two cassettes requires a plurality of drive sources for driving in different directions a head base supporting the magnetic head thereon, and this invites a complicated structure of the unit.

In this connection, the inventors of the present invention formerly proposed a driving unit for a double-cassette tape player using a single magnetic head and capable of moving the magnetic head in different directions by a single motor as disclosed in Japanese Utility Model Application No. 62-18520. FIG. 17 shows the prior art application. In the driving unit designed for receiving microcassettes, a chassis 81 has two cassette receiving areas A and B which receive cassettes Ca and Cb respectively, with their tape-exposed portions being faced downwardly in the drawings. The cassette receiving area A is provided with a pair of reel bases 82a and 82b and a capstan 83, whereas the other cassette receiving area B is provided with a pair of reel bases 84a and 84b and a capstan 85. The chassis 81 is further provided with a slide member 86 which is slidably movable in the X-Y direction. The slide member 86 is provided with a head base 87 which is supported by a guide groove 86a formed in the slide member 86 for slidably movement in the A-B direction. The head base 87 supports thereon a magnetic head 88 and a pinch roller 89. When a recording or reproducing operation is effected against the cassette half Ca on the cassette receiving area A, the head base 87 is moved in the A-direction, and the slide member 86 is subsequently driven in the X-direction to bring the magnetic head 88 into contact with the magnetic tape in the cassette Ca and to urge the pinch roller 89 against the capstan 83 to closely sandwich the magnetic tape therebetween and make it travel in the cassette Ca. When a recording or reproducing operation is effected against the cassette Cb in the cassette receiving area B, the head base 87 is moved in the B-direction, and the slide member 86 is subsequently driven in the X-direction to bring the magnetic head 88 into contact with the magnetic tape in the cassette Cb and to urge the pinch roller 89 against the capstan 85 to closely sandwich the magnetic tape therebetween and travel it in the cassette Cb.

In a driving mechanism for driving the slide member 86 and the head base 87, a change gear is rotated in forwarded and reverse directions by a single motor to move the head base 87 in the A- or B-direction and move slide member 86 in the X- or Y-direction. This arrangement is common to an embodiment of the invention and will be described in detail later with reference to an explanation of an embodiment, so its detailed explanation is omitted here.

In a system using a single motor to drive the slide member 86 and the head base 87 as in the aforegoing prior art, the motor must be properly controlled by always detecting the present mode, i.e. where the slide member 86 is positioned in the X-Y direction, and where the head base 87 is positioned in the A-B direction. For the purpose of this detection, the aforegoing prior art UM application No. 62-18520 uses a leaf switch to detect in which direction the slide member 86 is moved and in which direction the head base 87 is moved.

This detection method, however, requires a number of switches to precisely detect positions of the head base 87, etc. and causes a complicated structure of the system. Additionally, since a chatering region is inevitable between On-Off conditions in such a leaf switch, it is difficult to establish a precise or acurate timing. Further, upon a power-on of the power supply subsequent to a stop condition, a mechanism of this type must acknowledge the present mode of the unit. However, in order to arrange the leaf switch to effect this acknowledgement and an initializing operation, a number of further switches and a complicated control circuit are required.

It is therefore a first object of the invention to provide a mode detection apparatus for a double-cassette tape player which can establish a detection mechanism capable of precisely detecting respective modes and capable of precisely effecting an initializing operation subsequent to a power-on, but does not invite a great increase in the number of parts or in the mounting space.

In the mechanism such as the aforegoing prior art U.M. application No. 62-18520 using a single motor to drive the head base 87 and the slide member 86, a slip mechanism is required between a driving mechanism of the head base 87 and a driving mechanism of the slide member 86 in order to establish relative timings of their motions. The use of the slip mechanism, however, often causes a relative displacement between the head base 87 and the slide member 86 caused by an undesired slip of the slip mechanism when an external force is applied to the head base 87, etc. This phenomena is not readily detected precisely by the prior art detection apparatus using a leaf switch. As a result, the prior art detection apparatus often misunderstands that the head base 87 has fully moved although it is actually located between both cassette receiving areas A and B, and hence permits the slide member 86 to move in the X-direction. As a result, the head base 87 in a halfway position is moved in the X-direction and locked there. Then the unit falls in an unreturnable configuration.

It is therefore a second object of the invention to provide an error motion preventing apparatus in a double-cassette tape player which can precisely detect positions of the head base and the slide member, can detect a locked condition upon a movement of the slide member toward the cassette receiving area before a full movement of the head base to the cassette receiving area caused by a relative displacement between the head base and the slide member upon an accidental slip of the slip mechanism, and can subsequently return the mechanism to a proper configuration.

SUMMARY OF THE INVENTION

The first object of the invention is attained by an inventive system arranged as follows.

In a double-cassette tape player including first and second cassette receiving areas each having reel bases and a capstan and both loaded with cassettes thereon in alignment so as to face their tape-exposed portions in the same direction; a slide member extending to the full length between both said cassette receiving areas; a head base supporting a magnetic head thereon and provided on said slide member for alternative reciprocal movement to positions opposed to said tape-exposed portions of said cassettes; and a change gear driven by a motor in forward and reverse directions to transmit its rotating power to a rack of said head base via a slip mechanism, said change gear having a cam which urges said slide member toward one of said cassette receiving areas after said head base moves to one of said positions opposed to said tape-exposed portions of said cassettes, an improvement further including a mode detection apparatus consisting of a detection pattern provided on said change gear and a pair of detectors opposed to said detection pattern, said detection pattern having a configuration satisfying the following conditions (a) through (c):

(a) detected points detected by said detectors being common in whichever direction toward said first cassette receiving area or toward said second cassette receiving area said head base is moving when said slide member is lifted up toward said cassette receiving areas by said cam of said change gear, (b) a detection level changing point upon a forward rotation of said change gear and a detection level changing point upon a reverse rotation of said change gear being located at identical angular positions with respect to said common detection point in (a) above, and (c) combinations of detection level changes of said detectors being different between those upon a forward rotation of said change gear and those upon a reverse direction of said change gear as far as said detection level changing points of (b) above are concerned.

The further object of the invention is achieved by an inventive system arranged as follows.

In a double-cassette tape player including first and second cassette receiving areas each having reel bases and a capstan and both loaded with cassettes thereon in alignment so as to face their tape-exposed portions in the same direction; a slide member extending to the full length between both said cassette receiving areas; a head base supporting a magnetic head thereon and provided on said slide member for alternative reciprocal movement to positions opposed to said tape-exposed portions of said cassettes; and a change gear driven by a motor in forward and reverse directions to transmit its rotating power to a rack of said head base via a slip mechanism, said change gear having a cam which urges said slide member toward one of said cassette receiving areas after said head base moves to one of said positions opposed to said tape-exposed portions of said cassettes, an improvement further including a mode detection apparatus consisting of a detection pattern provided on said change gear and a pair of detectors opposed to said detection pattern; a stopper member configured to prevent a movement of said slide member toward one of said cassette receiving areas against an urging force of said cam of said change gear in the same direction when said head base cannot move fully toward said cassette receiving area due to a relative displacement between said change gear and said head base caused by a slip of said slip mechanism; a detection circuit for measuring the value and the lasting time of a lock current flowing in said motor for driving said change gear when said stopper member prevents a movement of said slide member; and a returning circuit for rotating said motor in the opposite direction when said value and said lasting time of said lock current both exceed predetermined values.

According to the invention, the head base is moved by a rotation of a single change gear in one direction to a position opposed to the tape-exposed portion of the cassette of the first cassette receiving area, and it is moved by a rotation of the change gear in the opposite direction to a position opposed to the tape-opposed position of the cassette half on the second cassette receiving area. At this time, the both detectors detect a common position of the detection pattern when the head base is in a recording or reproducing mode opposed to the cassette on the first cassette receiving area and when the head base is in a recording or reproducing mode opposed to the cassette half on the second cassette receiving area. Then the head base is moved symmetrically by a rotation of the change gear in one direction and a rotation of same in the opposite direction from the common detected position. The detection pattern on the change gear is configured to produce changes in the detection levels at equal rotating angles in both rotating directions during those symmetrical motions. However, combinations of changes in the detection levels by the pair of detectors at the changing points at equal rotating angles are different between opposite rotations of the change gear. Therefore, the position of the head base in symmetrical movement in the right and left directions can be known to be a movement in whichever direction, by judging the combination of level changes of the pair of detectors. Further, since combinations of changes in the detection levels of the pair of detectors are different between opposite the rotations of the change gear, it is possible to also detect the rotating direction of the change gear. Therefore, by rotating the change gear responsively in a predetermined direction upon a power-on, for example, it is possible to move the head base to the stop position of the first cassette receiving area and effect a mode setting operation from the position to effect an initializing operation.

Further, according to the invention, a power of the change gear is transmitted to the rack of the head base, and the head base is moved reciprocally to a position opposed to the first cassette receiving area and to a position opposed to the second cassette receiving area. Further, the slide member associated with the head base is driven toward the cassette receiving area by the cam provided on the change gear, and the magnetic head on the head base reaches a position for contacting the tape in the cassette half on one of cassette receiving areas. The power of the change gear is transmitted to the rack of the head base via the slip mechanism. If the slip mechanism undergoes an accidental slip caused by an external force, etc., a relative displacement is produced between the head base and the slide member. Further, since each mode is established based on a signal from the detection pattern on the change gear, the slide member starts to move toward the cassette receiving area when the change gear reaches a predetermined rotation angle, regardless an accidental slip of the slip mechanism. At this time, however, the head base engages the stopper member, and prevents a further movement of the slide member. This locked condition can be known by detecting the lock current of the motor which drives the change gear. Further, since the motor is continuously supplied with a current while the mechanism is in such a locked condition, the locked condition can be detected also by counting the current lasting time. Therefore, a complete locked condition is acknowledged when the lock current value and the motor flowing current time both reach predetermined values. Upon this acknowledgement, the return circuit rotates the motor in the opposite direction so that the slide member is driven away from the cassette receiving area to return the mechanism into a proper configuration.

BRIEF DESCRIPTION OF THE DRAWINGS

FIGS. 1 through 16(B) show a preferred embodiment of the invention in which:

FIG. 1 is a plan view of a driving unit of a double-cassette tape player;

FIG. 2 is a plan view of the driving unit of FIG. 1 as seen through a chassis to show a power transmission assembly disposed behind the chassis;

FIG. 3 is an elevation as seen from arrow III in FIG. 1;

FIG. 4 is a plan view of a change gear as seen from the same direction as FIG. 1;

FIG. 5 is a side elevation of the change gear;

FIG. 6 ia a back elevation of the change gear;

FIGS. 7 and 8 are fragmentary plan views showing different operative positions of a head base when driving a left-hand cassette half;

FIG. 9 is a plan view showing the head base on halfway in a rightward movement;

FIGS. 10 (1)–(6) is a plan view showing different rotating positions of a detection plate in CW direction as seen from the same direction as FIG. 4;

FIG. 11 is a view showing changes in the output levels of a pair of detectors during a rotation of the detection plate in the CW-direction;

FIG. 12 is a view showing changes in the output level of the pair of detectors during a rotation of the detection plate in CCW-direction;

FIG. 13 is a flow chart showing how to control a motor for an initializing operation;

FIG. 14 is a fragmentary plan view showing the head base in a position other than its proper positions;

FIG. 15 is a circuit diagram showing an assist motor driving circuit and a locked condition detecting circuit;

FIG. 16(B) is a view showing the motor current in a locked condition.

DETAILED DESCRIPTION

Figure 1:
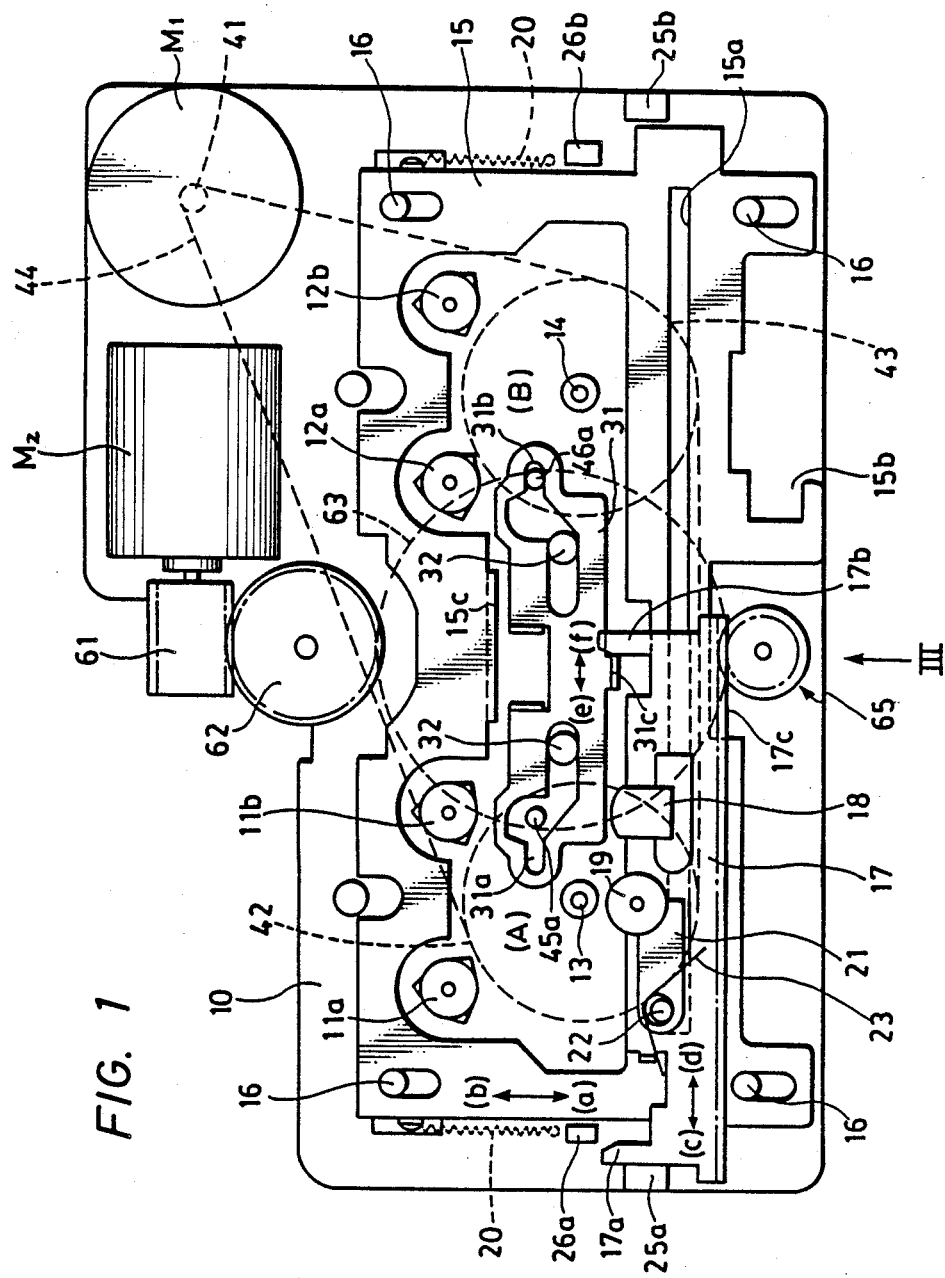

The invention is described below, referring to a preferred embodiment illustrated in the drawings.

Figures 2, 3:
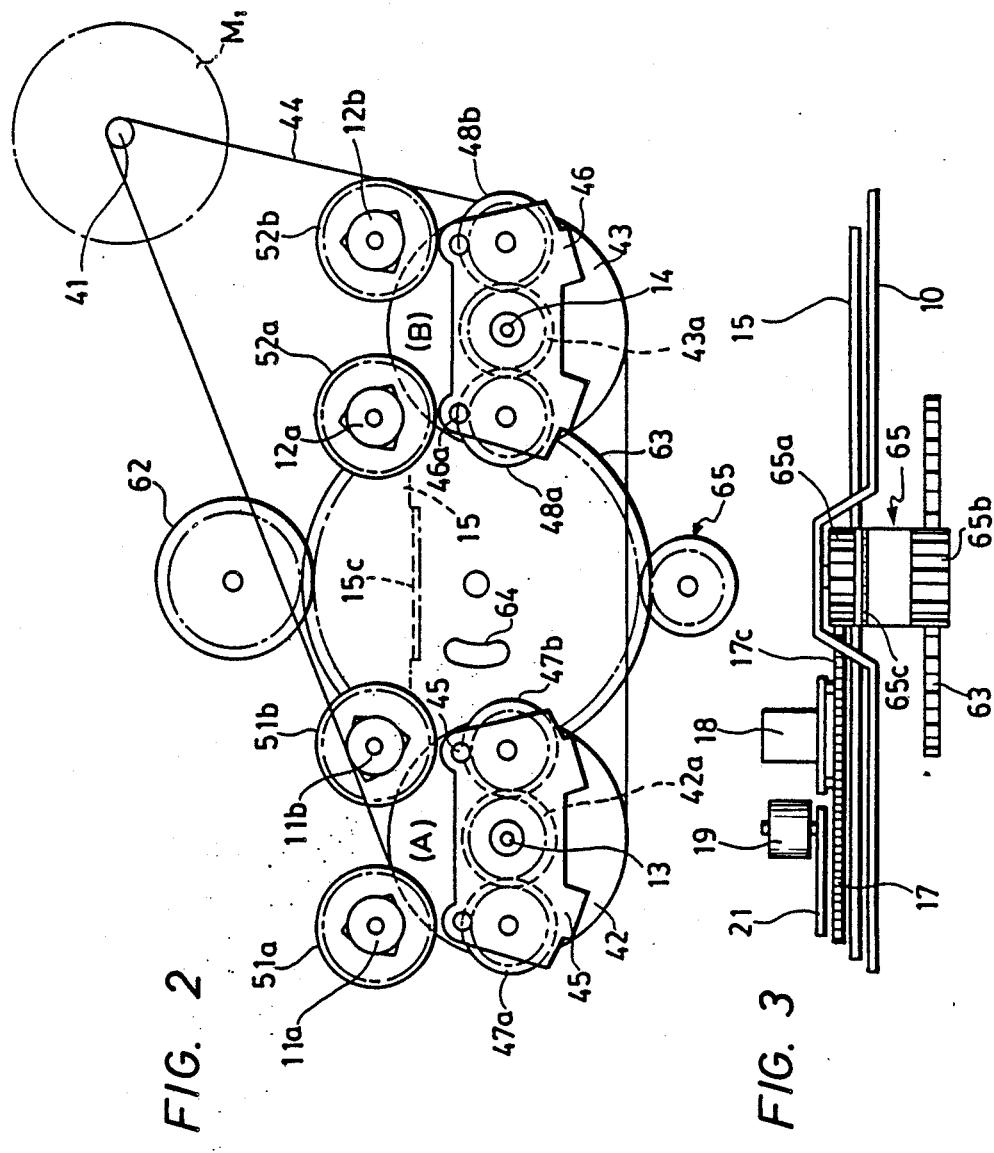
Figure 4:
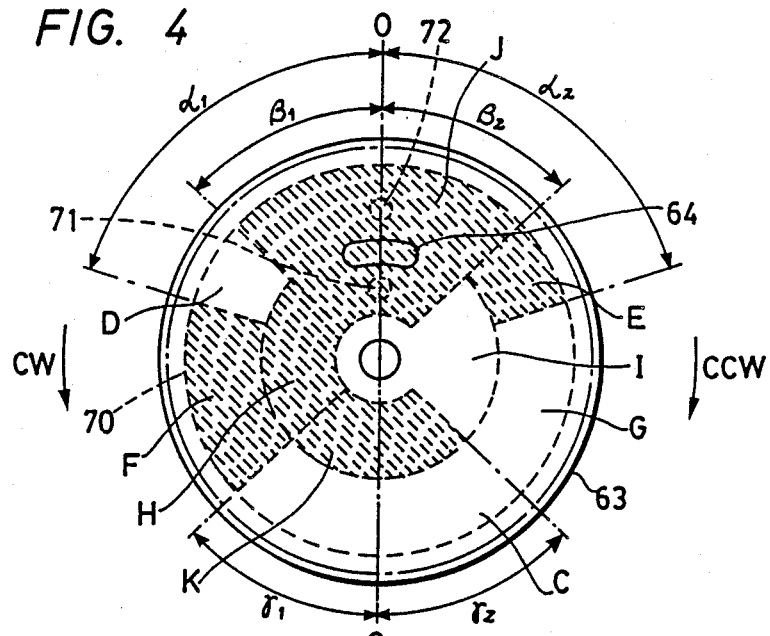
Figure 5:
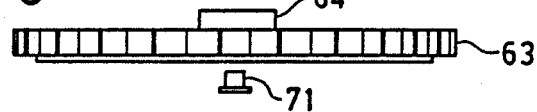
Figure 6:
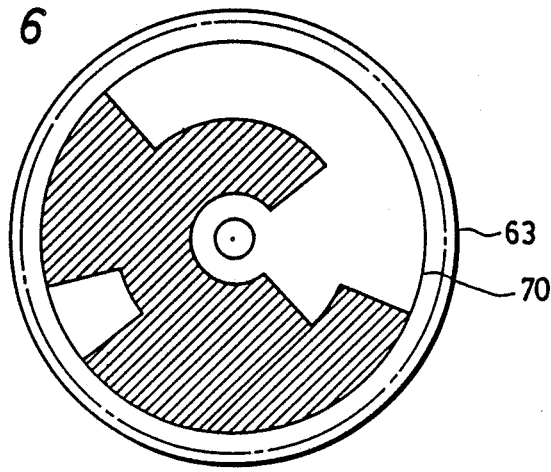

FIG. 1 is a plan view showing a driving unit of a double-cassette tape player embodying the invention as seen from the upper side of a chassis, FIG. 2 is a plan view showing a power transmission assembly disposed at the back of the chassis as seen through the chassis, FIG. 3 is a fragmentary elevation of the driving unit as seen from arrow III direction of FIG. 1, FIG. 4 is a plan view showing a change gear as seen from the same direction as FIG. 1, FIG. 5 is a side elevation of the change gear, and FIG. 6 is a back elevation of the change gear.

The illustrated driving unit is designed for receiving microsize cassettes. However, the invention may be used for a unit for normal size cassettes.

In FIG. 1, reference numeral 10 designates a chassis on which two cassette receiving areas (A) and (B) are disposed in the left-hand and right-hand isolated zones. In the left-hand cassette receiving area (A) are disposed a pair of reel bases 11a and 11b and a capstan 13. In the right-hand cassette receiving area (B) are disposed a pair of reel bases 12a and 12b and a capstan 14. As shown in FIGS. 7 and 8, a cassette C1 is received by the left-hand cassette receiving area (A) while another cassette C2 is received by the right-hand cassette receiving area (B). These cassettes C1 and C2, when received by the cassette receiving areas (A) and (B), are aligned so as to face their tape-exposed portions downwardly in FIG. 1.

A slide member 15 is provided on the chassis 10. The slide member 15 has a length extending between both cassette receiving areas (A) and (B) and are guided by four guide pins 16 for slidable movement in (a) and (b) directions. Between the slide member 15 and the chassis 10 is provided a spring 20 which biases the slide member 15 in the (a) direction. The slide member 15 is provided with a guide groove 15a extending in the left-and-right direction in the drawing to guide a head base 17 for reciprocal movement in the right-and-left direction ((c) and (d) direction) on the slide member 15. The head base 17 supports a magnetic head 18 fixed thereto. Further, on the head base 17 is provided a pinch roller 19. The pinch roller 19 is held in a roller holder 21 which is supported pivotably by a support pin 22 on the head base 17. The roller holder 21 is biased counterclockwise by a spring 23.

The head base 17 has a guide projection 17a at the left end thereof in the drawing and a guide projection 17b at the right end thereof. The chassis 10 has a stopper 25a and a guide 26a at left-hand portions thereof and a stopper 25b and a guide 26b at the right end thereof. The stoppers 25a and 25b and the guides 26a and 26b are long enough to contact the guide projection 17a and 17b respectively.

As shown in FIG. 9, the chassis 10 has stoppers 28a, 28b, 28c and 28d which are opposed to the left and right guide projections 17a and 17b of the head base 17 from upward positions in the drawings. The left and right guide projections 17a and 17b are disposed so that one of them never fails to confront one of the stoppers 28a, 28b, 28c and 28d throughout the entire motion of the head base 17 on the slide member 15 in the (c) and (d) direction except when the head base 17 is at one of terminal ends of its movement stroke, i.e. at the farthest positions in the (c) direction and in the (d) direction. Therefore, the slide member 15 can move in the (b) direction when the head base 17 has moved to the utmost end in the (c) or (d) direction. However, when the head base 17 is in a halfway position, the movement of the slide member 15 in the (b) direction is prevented by one of the guide projection 17a or 17b of the head base 17 which engages one of the stoppers 28a through 28d.

In a central portion of the chassis 10 is provided a change lever 31 which is located in a cutout in the center of the slide member 15. The change lever 31 is guided by a guide pin 32 and supported slidably in the right-and-left direction ((e) and (f) direction) in the drawing. The change lever 31 has a regulating groove 31a at the left end thereof in the drawing and a regulating groove 31b at the right end thereof. The lever 31 further includes a bent chip 31c which extends from the center of the lower end of the change lever 31 vertically from the front surface of the drawing sheet. The bent chip 31c extends long enough to engage the guide projections 17a and 17b at the left and right ends of the head base 17.

On the chassis 10 are provided a main motor M1 and an assist motor M2. The main motor M1 drives the capstans 13 and 14, and the assist motor M2 drives the head base 17 and the slide member 15. As shown in FIG. 2, the left-hand capstan 13 is integral with a flywheel 42 at the back of the chassis 10, and the right-hand capstan 14 is integral with a flywheel 43 at the back of the chassis 10. A belt 44 extends along circumferences of the flywheels 42 and 43 and pulley 41 on the driving shaft of the main motor M1 so that the flywheels 42 and 43 and the capstans 13 and 14 rotate clockwisely or counterclockwisely in response to a forward or reverse rotation of the main motor M1.

As shown in FIG. 2, the left-hand flywheel 42 has an integral driving gear 42a, and the right-hand flywheel 43 has an integral driving gear 43a. The left-hand capstan 13 supports an idle plate 45 for pivotal movement relative thereto, and the right-hand capstan 14 supports an idle plate 46 for pivotal movement relative thereto. The left-hand idle plate 45 supports a pair of idle gears 47a and 47b which continuously engage the driving gear 42a. Similarly, the right-hand idle plate 46 supports a pair of idle gears 48a and 48b which continuously engage the driving gear 43a. The left-hand pair of reel bases 11a and 11b are integral with reel gears 51a and 51b respectively. The idle gears 47a and 47b are opposed at positions for engagement with the reel gears 51a and 51b respectively. Similarly, the right-hand pair of reel bases 12a and 12b are integral with reel gears 52a and 52b, and the idle gears 48a and 48b are opposed at positions for engagement with the reel gears 52a and 52b respectively.

The left-hand idle plate 45 has an idle pin 45a, and the right-hand idle plate 46 has an idle pin 46a. The idle pins 45a and 46a project to the front surface side of the chassis 10, and as shown in FIG. 1, one idle pin 45a is located to be selectively regulated by the regulating groove 31a of the change lever 31 whereas the other idle pin 46a is located for regulation by the regulating groove 31b.

A worm gear 61 is provided on the driving shaft of the assist motor M2 on the chassis 10. The worm gear 61 engages a transmission gear 62 which engages a change gear 63 provided at the back of the chassis 10. As shown in FIGS. 2 and 4, the change gear 63 has an integral driving cam 64 thereon. The slide member 15 has a driving chip 15c which is bent at a central portion of the slide member 15 and disposed to be urged by the driving cam 64 when the change gear 63 rotates. That is, when the change gear 63 rotates, the slide member 15 is urged by the driving cam 64 upwardly in the (b) direction. The chassis 10 is provided with a head base driving gear 65. As shown in FIG. 3, the head base driving gear 65 consists of an upper gear 65a and a lower gear 65b which are held in close contact via a felt 65c but can slip relatively when an impulse is applied thereto. The lower gear 65b engages the change gear 63, and the upper gear 65a engages the rack 17c formed along the lower margin of the head base 17.

As shown in FIGS. 4 and 6, a detection plate 70 is secured to the back face of the change gear 63, i.e. the face which is opposite to the surface provided with the driving cam 64. The detection plate 70 is used for an optical detection. The hatched portion in the drawing is a black absorption pattern of the detection plate 70, and the other non-hatched portion is a reflection pattern of silver, white or other color. A pair of optical detectors 71 and 72 are opposed to the detection plate 70. The optical detectors 71 and 72 are photoreflectors each consisting of a light-emitting element and a light-receptor element for detecting reflected light. One optical detector 71 is an (interior) sensor opposed to a radially inward position of the detection plate 70 whereas the other optical detector 72 is an (exterior) sensor opposed to a radially outward position of the detection plate 70.

As shown in FIG. 4 which shows the detection plate 70 by seeing the change gear 63 from its front surface, the absorption pattern and the reflection pattern have areas which are symmetrical in the right and left direction about a center line O—O (the line connecting the center of the change gear 63 and the middle point of the driving cam 64). Among these patterns, the sectorial portion designated by J has margins at right and left symmetrically angled (by $\beta 1$ and $\beta 2$) positions from the center line O—O. At an up-and-down symmetrical position with respect to area J are provided an absorption area at K and a reflection area at C. These areas K and C also have margins at right and left symmetrically angled (by $\gamma 1$ and $\gamma 2$) positions from the center line O—O. In radially outward portions of the area defined by angles $\beta 1$ and $\alpha 1$ and the area defined by angles $\beta 2$ and $\alpha 2$, the left-hand portion of the center line O—O is a reflection area indicated by D, and the right-hand portion is an absorption area indicated by E. These areas D and E are located at right and left symmetrically angled positions and have the same configuration. However, the absorption area and reflection areas are in an opposite relationship in these regions. In the radially outward portion defined by angles α1 and γ1 and in the radially outward portion defined by angles α2 and γ2, the left-hand portion is an absorption area indicated by F, and the right-hand portion is a reflection area indicated by G. These areas F and G are located at symmetrically angled positions about the center line O—O and have the same configuration. However, the absorption and reflection areas are in an opposite relationship in these regions. In the radially inward portion defined by angles β1 and γ1 and in the adially inward portion defined by angles β2 and γ2, the left-hand portion of the center line O—O is an absorption area indicated by H, and the right-hand portion is a reflection area indicated by I. These areas H and I are located at right and left symmetrically angled positions and have the same configuration. However, one of them is an absorption area and the other is a reflection area, that is, their patterns are inverted.

Figure 11:
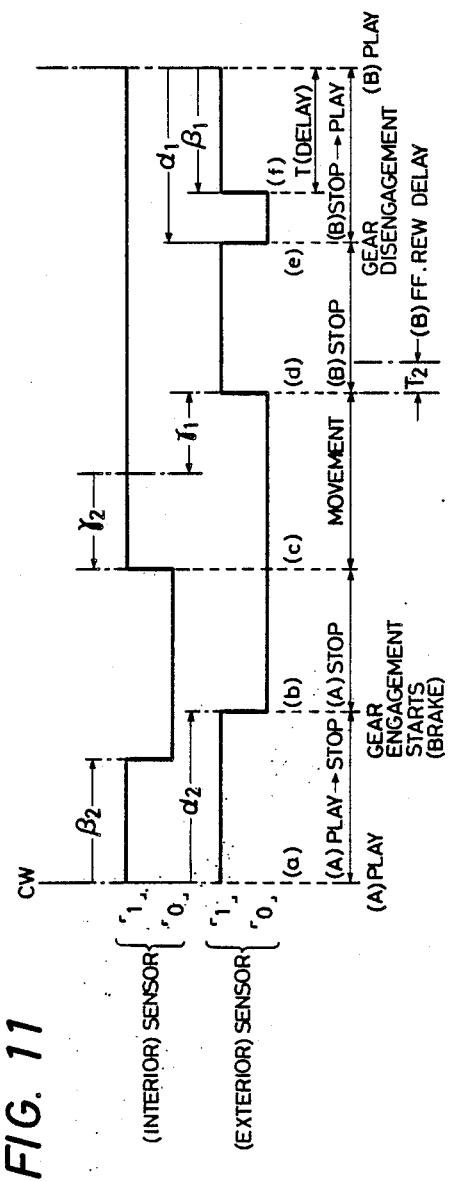
Figure 12:
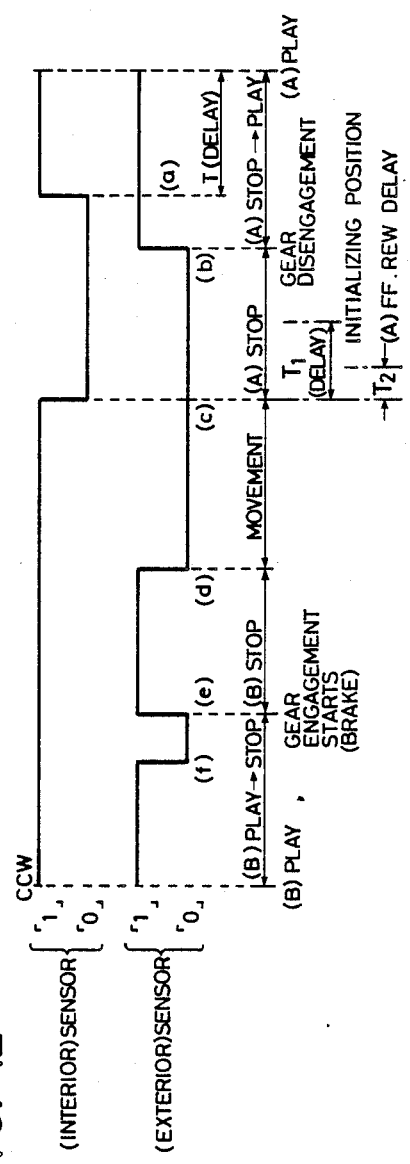

When the change gear 63 rotates, the (interior) sensor 71 is opposed to areas J, H, K and I, and the (exterior) sensor 72 is opposed to areas J, D, F, C, G and E. When the change gear 63 rotates, output levels of the optical sensors 71 and 72 change every time when they pass by the boundaries shown by α, β and γ (the boundary positions of respective angels are change points of detection levels). FIGS. 11 and 12 show changes in the output levels of the (interior) sensor 71 and the (exterior) sensor 72. The output level of the detection circuit exhibits "1" when the detectors are opposed to the absorption pattern (hatched portions), and exhibits "0" when they are opposed to the reflection pattern (non-hatched portions). For example, when the change gear 63 rotates by angle α1 in the CW direction, the (exterior) sensor 72 moves from area D to area F, and its output level changes from "0" to "1". When the change gear 63 rotates in the CCW direction by the same angle α2, the (exterior) sensor 72 moves from area E to area G, and its output level changes from "1" to "0". Thus the detection output level is changed upon equal angle rotations (α1 and α2) of the change gear 63 between opposite rotations in the CW direction and in the CCW direction.

Figure 15:
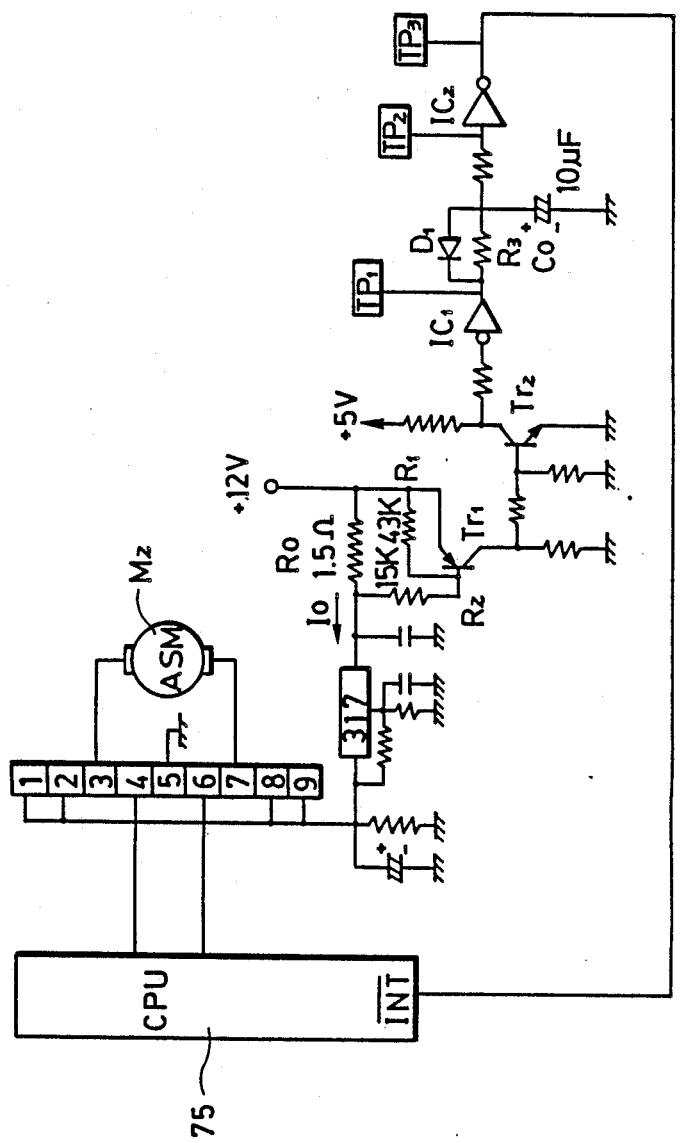

FIG. 15 shows a detection circuit for driving the assist motor M2 and for preventing an erroneous operation of same. CPU75 is used for performing an operation program on a mode change, etc. for not only the assist motor M2 but also the main motor M1. The circuit of FIG. 15 detects a lock current of the assist motor M2 when it falls in a locked condition, and detects the time of the current flowing in the assist motor M2 after being locked.

The system operates as described below.

A pair of cassettes C1 and C2 are located on the respective cassette receiving areas (A) and (B), with their tape-exposed portions being faced downwardly in the drawing. In the illustrated embodiment, the cassette half C1 alone on the cassette receiving area (A) is shown in FIGS. 7 and 8. However, the other cassette C2 (not shown) is similarly loaded on the cassette receiving area (B).

In order to drive the cassette C1, on the left-hand cassette receiving area (A), the transmission gear 62 is driven by the assist motor M2 in the counterclockwise direction. Responsively, the change gear 63 in engagement with the transmission gear 62 rotates in the CCW direction (clockwise direction), and the head base driving gear 65 in engagement with the change gear 63 rotates counterclockwise. Therefore, the head base 17 having the rack 17c in engagement with the upper gear 65a of the head base driving gear 65 is moved in the (c) direction along the guide groove 15a of the slide member 15. As a result, as shown in FIG. 7, the magnetic head 18 and the pinch roller 19 on the head base 17 are opposed to the tape-exposed portion of the left-hand cassette half C1. Respectively, the guide projection 17b formed in the left of the head base 17 urges the bent chip 31c of the change lever 31 to the left in the drawing, and the change lever 31 is driven in the (e) direction. Then the right-hand regulating groove 31b of the change lever 31 regulates the idle pin 46a in the right-hand cassette receiving area (B), and the righthand idle plate 46 is held not pivotable. In contrast, the idle pin 45a in the left-hand cassette receiving area (A) is not limited by the regulating groove 31a of the change lever 31, and the left-hand idle plate 45 is pivotable.

When the head base 17 moves in the (c) direction, the left margin of the guide projection 17a at the left end thereof engages the stopper 25a, and the head base 17 stops at this position. The assist motor M2 continues its rotation also after the head base 17 stops. Due to this, the change gear 63 continues its clockwise rotation, and the lower gear 65b of the head base driving gear 65 shown in FIG. 3 is also driven continuously by the change gear 63. However, the head base 17 in engagement with the upper gear 65a engages the stopper 25a and cannot move further in the (c) direction. Therefore, the upper gear 65a remains unrotatable while slipping relatively from the lower gear 65b via the felt 65c. Due to this slip, the change gear 63 is permitted to continue its rotation in the CCW direction also after the head base 17 engages the stopper 25a, and the driving cam 64 on the change gear 63 is brought into engagement with the driving chip 15c of the slide member 15. Then as shown in FIG. 8, the driving cam 64 urges the slide member 15 upwardly in the (b) direction against the energy of the spring 20. Therefore, the head base 17 on the slide member 15 is also moved in the (b) direction by a movement of the guide projection 17a between the stopper 25a and the guide 26a. Then the magnetic head 18 on the head base 17 contacts the tape in the cassette C1, and the pinch roller 19 urges the tape for close contact with the capstan 13.

When the left-hand flywheel 42 is driven clockwisely by the main motor M1 from this configuration, the idle plate 45 swings clockwisely in response to the rotation of the flywheel 42, and the left-hand gear 47a engages the reel gear 51a. Therefore, the power of the flywheel 42 is transmitted to the reel gear 51 via the driving gear 42a and the idle gear 47a, and the reel base 11a is driven clockwisely. The magnetic tape in the cassette C1 in a closely sandwiched condition between the clockwisely rotating capstan 13 and the pinch roller 19 is driven to the left and rolled on the reel base 11a for a recording or a reproduction by the magnetic head 18.

When the slide member 15 withdraws in the (a) direction to locate the head base 17 apart from the cassette C1 (at the position shown in FIG. 7), a high-speed clockwise rotation of the flywheel 21 by the main motor M1 causes the idle gear 47a to drive the reel base 11a clockwisely to effect a fast-forwarding of the tape. In contrast, when the main motor M1 is rotated in the opposite direction, the flywheel 42 rotates counterclockwisely, and the idle plate 46 swings counterclockwisely to bring the idle gear 47b into engagement with the reel gear 51b to drive the reel base 11b counterclockwisely for a tape rewinding.

When a reproduction, recording, fast-forwarding and rewinding is effected against the cassette C1 in the left-hand cassette receiving area (A), the idle pin 46a in the right-hand cassette receiving area (B) is regulated by the regulating groove 31b of the change lever 31, and the idle plate 46 is held unrotatable. Therefore, when the right-hand flywheel 43 is driven clockwisely or counterclockwisely by the main motor M1, the idle gears 48a and 48b are held apart from the reel gears 52a and 52b, and no power is transmitted to the reel gears 52a and 52b.

In order to drive the cassette C2 (not shown) in the right-hand cassette receiving area (B), the assist motor M2 is rotated in the opposite direction to pivot the change gear 63 in the CW direction (counterclockwise direction) via the transmission gear 62. As a result, the head base driving gear 65 is driven clockwisely, and the upper gear 65a thereof moves the head base 17 in the (d) direction. When the head base 17 reaches the position shown in FIG. 9, the left-hand guide projection of the head base 17 engages the bent chip 31c of the change lever 31. When the head base 17 further moves to the right (in the (d) direction) from this position, the change lever 31 is moved by the guide projection 17b in the (f) direction. Then the idle plate 45 in the left-hand cassette receiving area (A) is regulated by the regulating groove 31a at the left end of the change lever 31, and the idle plate 46 in the right-hand cassette receiving area (B) becomes free. In a similar fashion as motions in the left-hand cassette receiving area (A), after the right end of the head base 17 engages the right-hand stopper 25b, the slide member 15 is pushed up in the (b) direction by the power of the assist motor M2, and the head base 17 moves toward the cassette C2 for a reproduction or recording.

The detection plate 70 and the pair of optical detectors 71 and 72 associated with the change gear 63 effect their mode detecting operation as explained below.

Figure 10:
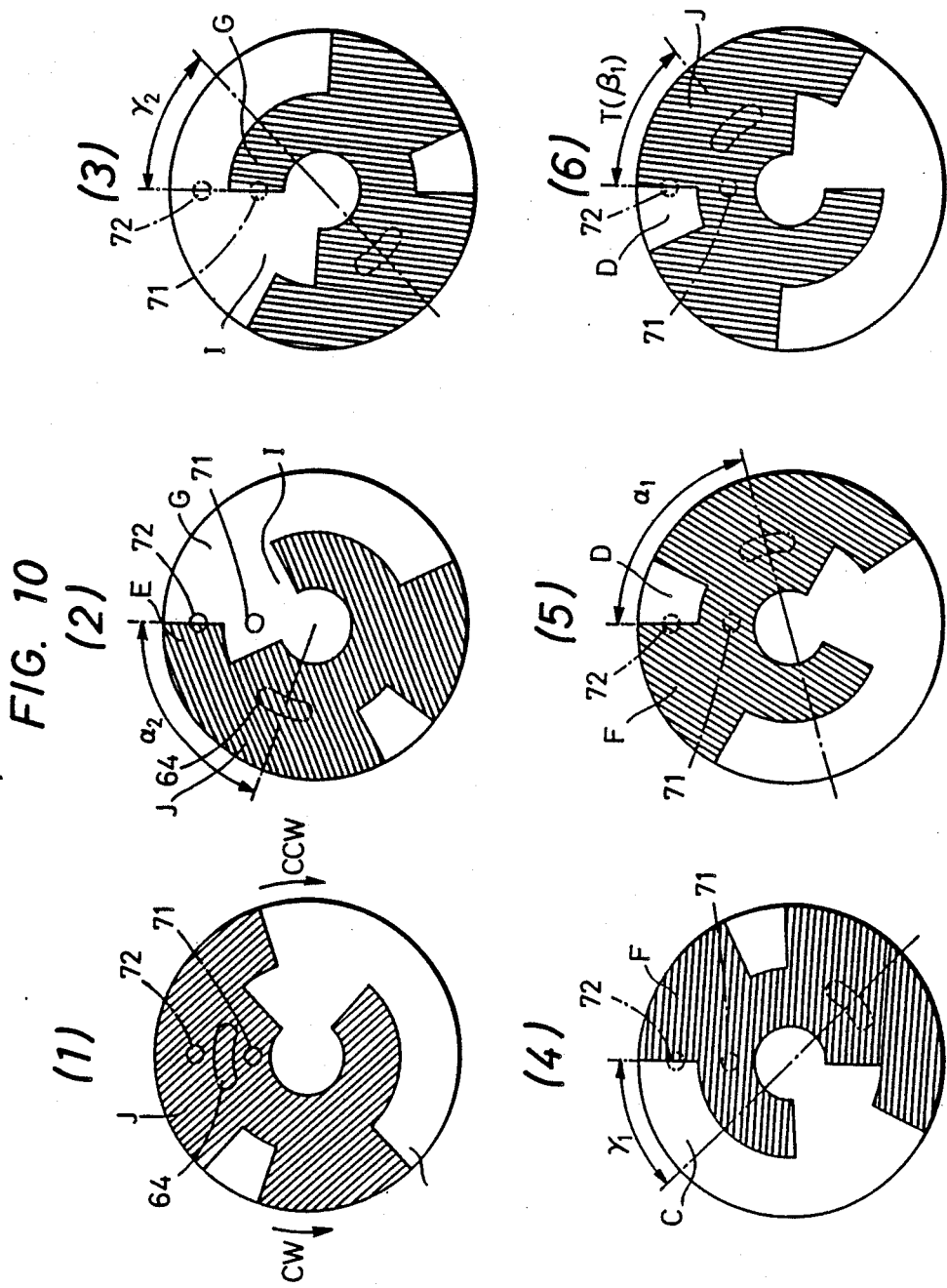

FIG. 10 shows at (1) through (6) sequential different angular positions of the change gear 63 during its rotation in the CW direction as from the recording or reproduction mode of the left-hand cassette receiving area (A) until establishment of the recording or reproduction mode of the right-hand cassette receiving area (B). FIG. 11 shows changes in detection output levels of the (interior) sensor 71 and (exterior) sensor 72 during movements from position to position through (a) to (f). Note that FIG. 10 shows the detection plate 70 as seen from the same direction as FIG. 4.

Position (a) corresponds to the recording or reproducing mode of the left-hand cassette receiving area (A). The slide member 15 is now lifted up in the (b) direction by the driving cam 64. The stop position of the change gear 63 and the detection plate 70 is the same as position (a) also when the right-hand cassette receiving area (B) is in the recording or reproducing mode. For a transfer from the recording and reproducing mode of the left-hand cassette receiving area (A) to the recording and reproducing mode of the right-hand cassette receiving area (B), the change gear 63 is rotated in the CW direction from position (a).

At position (a), the (interior) sensor 71 and the (exterior) sensor 72 both detect area J of the absorption pattern on the detection plate 70, and both detection levels exhibit "1". When the change gear 63 is rotated by α2 in the CW direction, the (interior) sensor 71 detects area I, and its output level exhibits "0", whereas the (exterior) sensor 72 reaches the boundary between areas E and G, and its output level changes from "1" to "0" (configuration of (b)). The slide member 15 held in an elevated position by the driving cam 64 during (a) to (b) drops in the (a) direction, and the left-hand cassette receiving area (A) is changed to the recording and reproducing mode to the stop mode. Just at position (b), the rack 17c of the head base 17 moving in the (a) direction together with the slide member 15 gets in engagement with the upper gear 65a of the head base driving gear 65. Therefore, the assist motor M2 is braked for a short time at the timing of (b), so that the gears can readily engage with each other.

When the change gear 63 rotates to position (c), the (interior) sensor 71 moves from area I to area G, and its detection level changes from "0" to "1". During positions (b) and (c), the rack 17c fully engages the upper gear 65a, and the slide member 15 fully moves in the (a) direction until the guide projection 17a at the left end of the head base 17 becomes free from regulation by the stopper 25a and the guide 26a. That is, up to position (c), the left-hand cassette receiving area (A) takes the stop mode (a configuration in which the magnetic head 18 is isolated from the tape). When the change gear 63 reaches position (d), the (exterior) sensor 72 moves from area C to area F, and its detection level changes from "0" to "1". During positions (c) and (d), the head base 17 moves in the (d) direction. When the change gear 63 rotates to position (e), the (exterior) sensor 72 moves from area A to area D, and its detection level once changes from "1" to "0". At the aforegoing position (d) the head base 17 completes its movement in the (d) direction, and the right margin of the guide projection 17b at the right end thereof engages the stopper 25b. After this, the slide member 15 is lifted up in the (b) direction by the driving cam 64, and the rack 17c is completely separated from the upper gear 65a at position (e). When the change gear 63 rotates to position (f), the (exterior) sensor 72 enters in area J, and its detection output is changed to "1" again. A delay time T is provided from point (f). When the time T has passed, the assist motor M2 stops and causes the change gear 63 to stop in the same configuration as (a). Concurrently, the right-hand cassette receiving area (B) is changed to the recording or reproducing mode.

For a transfer from the recording or reproducing mode of the right-hand cassette receiving area (B) to the recording or reproducing mode of the left-hand cassette receiving area (A), the change gear 63 rotates in the CCW direction from position (f) through (e) up to (a). Responsive changes in detection levels of the (interior) sensor 71 and (exterior) sensor 72 are shown in FIG. 12. The detection level diagram of FIG. 12 exhibits just a right-and-left inverted configuration of FIG. 11. As shown in FIG. 4, the angles for changes in the detection pattern are provided at right-and-left symmetrical angular positions abut the center line O—O (with reference to position (a) of FIG. 10) as indicated by α1, α2 and others. Therefore, the times of detection level changes are completely identical in FIGS. 11 and 12. For example, time (c) when the head base 17 begins to move toward the right-hand cassette receiving area (A). However, a combination of changes in the detection levels of the pair of detectors 71 and 72 at point (c) in FIG. 11 is different from that at point (d) in FIG. 12. At point (c) of FIG. 11, the (interior) sensor changes from "0" to "1" whereas the (exterior) sensor maintains "0". However, at point (d) of FIG. 12, the (interior) sensor maintains "1" whereas the (exterior) sensor changes from "1" to "0". That is, even at identical angular positions, a rotation of the change gear 63 in the CW direction and a rotation thereof in the CCW direction result in different combinations of detection level changes of the pair of detectors 71 and 72. Therefore, at every mode changing point, combinations of detection level changes of the pair of detectors never coincide so that any movement in a transfer from one mode to another of the system is acknowledged precisely without fail.

In order to transfer the system from the recording or reproducing mode of the left-hand cassette receiving area (A) to the fast-forwarding or rewinding mode of same, the change gear 63 is moved from point (a) to (b) in FIG. 11, the assist motor M2 is braked and stopped at point (b), and the main motor M1 is subsequently rotated forwardly or reversely at a high speed. In order to change the right-hand cassette receiving area (B) from the recording or reproducing mode to the fast-forwarding or rewinding mode, the change gear 63 is rotated in the CW direction as shown in FIG. 12, the assist motor M2 is braked and stopped at a detecting position of (e), and the main motor M1 is subsequently rotated forwardly or reversely at a high speed.

An initializing operation is explained below.

When the power supply is entered again after the driving unit is stopped, an initializing operation is effected so as to move the head base first to a predetermined mode position and subsequently to a desired mode position. The mode to which the head base is once returned in the initializing operation may be the stop mode of the left-hand cassette receiving area (A), i.e. an intermediate position between (b) and (c) in FIG. 11. Alternatively, the recording or reproducing mode of the left-hand cassette receiving area (A) may be selected as the returning position of the initializing operation.

Figure 13:
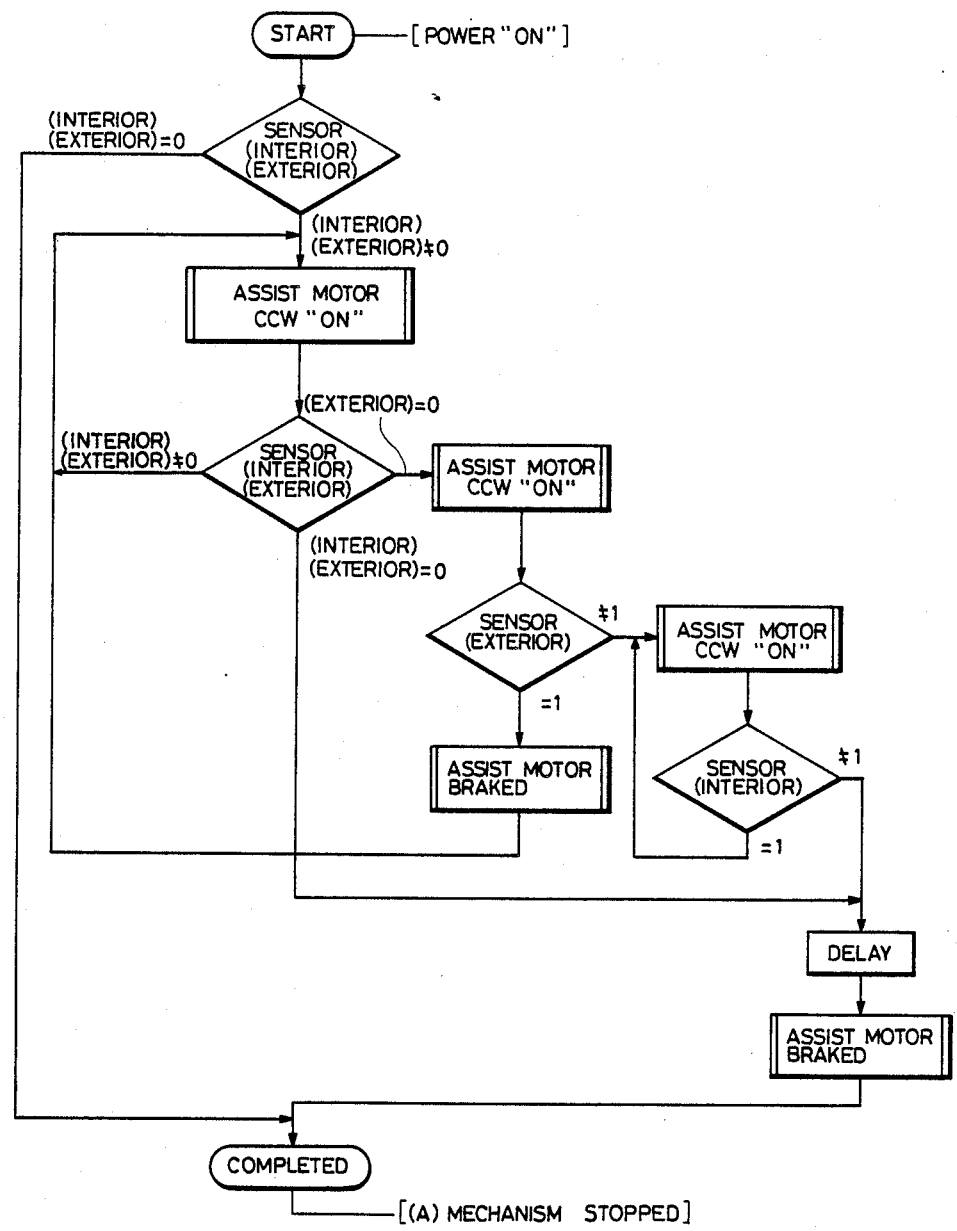

The flow chart of FIG. 13 shows a configuration in which the head base 17 is once returned to the stop mode position of the left-hand cassette receiving area (A) in an initializing operation after a power-on of the power supply. In the initializing operation, the change gear 63 is always rotated in the CCW direction except when the left-hand cassette receiving area (A) was in the stop mode upon the power-on (when the detection levels of sensors 71 and 72 both exhibit "0"). Responsive changes in the detection levels of both sensors 71 and 72 are shown in FIG. 12. For example, in case that the right-hand cassette receiving area (B) was in the recording/reproducing mode or in the fast-forwarding/rewinding mode when the power supply is entered, the change gear 63 is rotated in the CCW direction. When the (interior) sensor 71 and the (exterior) sensor 72 both become "0" (when the change gear 63 reaches (c) in FIG. 12), after a delay time T1, the assist motor M2 is stopped. From this position talem as a starting point, the head base is subsequently moved to the desired mode position. The change gear 63 is rotated in the CCW direction by the assist motor M2 also when the left-hand cassette receiving area (A) was in the recording/reproducing mode upon the power-on. However, since the head base 17 has already completed its movement in the (c) direction, the upper gear 65a and the lower gear 65b of the head base driving gear 65 slip relatively via the felt 65c during the CCW rotation of the change gear 63.

When the detection level become point (c) of FIG. 12 as in the aforegoing explanation, the delay time T1 is provided so as to stop the assist motor M2 after this.

If the recording/reproducing mode of the left-hand cassette receiving area (A) is selected as the returning position in the initializing operation, the change gear 63 is always driven in the CCW direction except when the detection levels of the (interior) sensor 71 and the (exterior) sensor 72 both exhibit "1", and the assist motor M2 is stopped when a delay time T has passed after detection of (a) shown in FIG. 12.

Control of the assist motor M2 and detection of erroneous operation of same are explained below.

Referring to a circuit diagram of FIG. 15, it is first explained how the assist motor M2 operates in its normal condition.

Figure 16A:
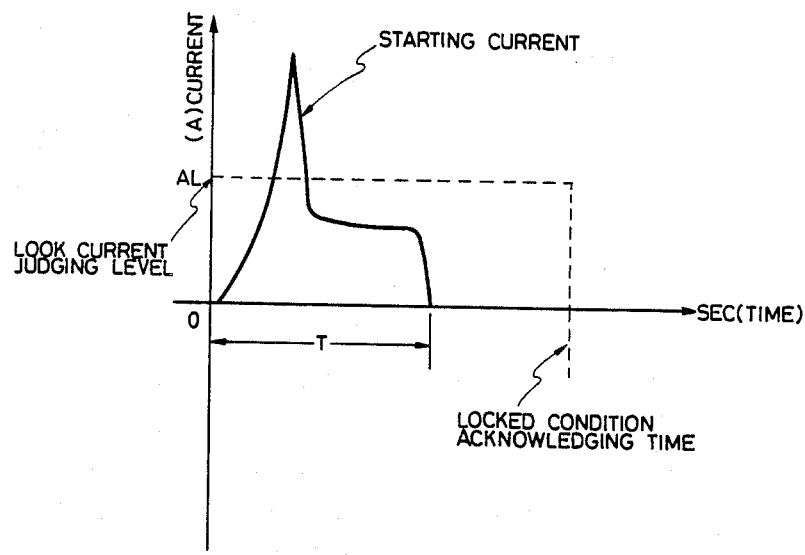
FIG. 16(A) is a view showing the motor current in a proper operative condition.

When the assist motor M2 is held unrotatable, a driving voltage of +12 V causes a current Io (107 mA) in a resistor Ro, and a voltage caused by a voltage drop is produced at both ends of the resistor Ro. Between the emitter and the base of a transistor Tr1, a voltage divided by resistors R1 and R2 appears. However, the transistor Tr1 is held off under this voltage. When the assist motor M2 is activated by an operation member, a large current flows temporarily at the starting time as shown in FIG. 16(A). The starting current changes the transistor Tr1 into "ON" for a time. At that time, the collector current of the transistor Tr1 changes a transistor Tr2 into "ON", and the inverter output TP1 of an IC1 becomes "1" (5 V). The inverter output is charged in a capacitor Co. The charging time is determined by a time constant defined by a resistor R3 and the capacitor Co. This charging elevates the voltage of an input gate TP2 of an IC2, and when the elevated voltage reaches 2.5 V, an inverter output TP3 of the IC2 is changed to "0" (0 V). However, when the assist motor M2 operates in a normal condition, the starting current immediately drops as shown in FIG. 16(A). Therefore, the transistor Tr1 is changed to "OFF" faster than the input gate TP2 of the IC2 reaches 2.5 V under the time constant. As a result, the voltage which was charged in the capacitor Co is discharged via a diode D1. In this fashion, the input gate TP2 of the IC2 cannot reach 2.5 V in a normal condition, and the inverter output TP3 of the IC2 maintains "1". As long as a CPU 75 is supplied with signals "1", this means that it is detected that the assist motor M2 operates properly in a normal condition, and a normal mode changing operation is performed according to a program of the CPU 75.

An explanation follows regarding a circuit operation in an abnormal condition in which the assist motor M2 is locked.

Figure 16B:
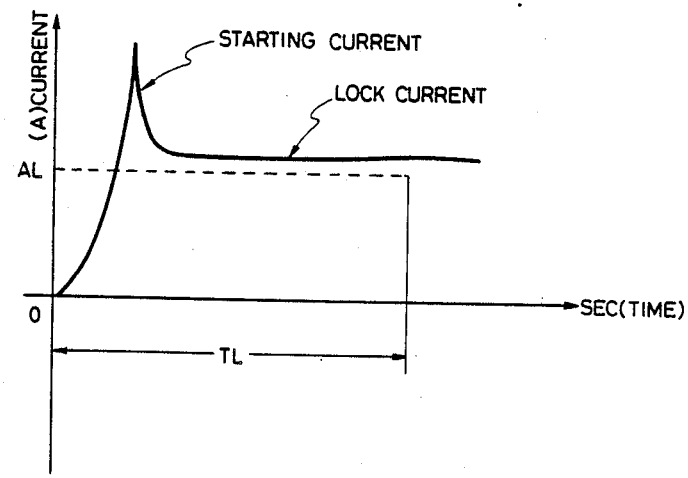
Figure 17:
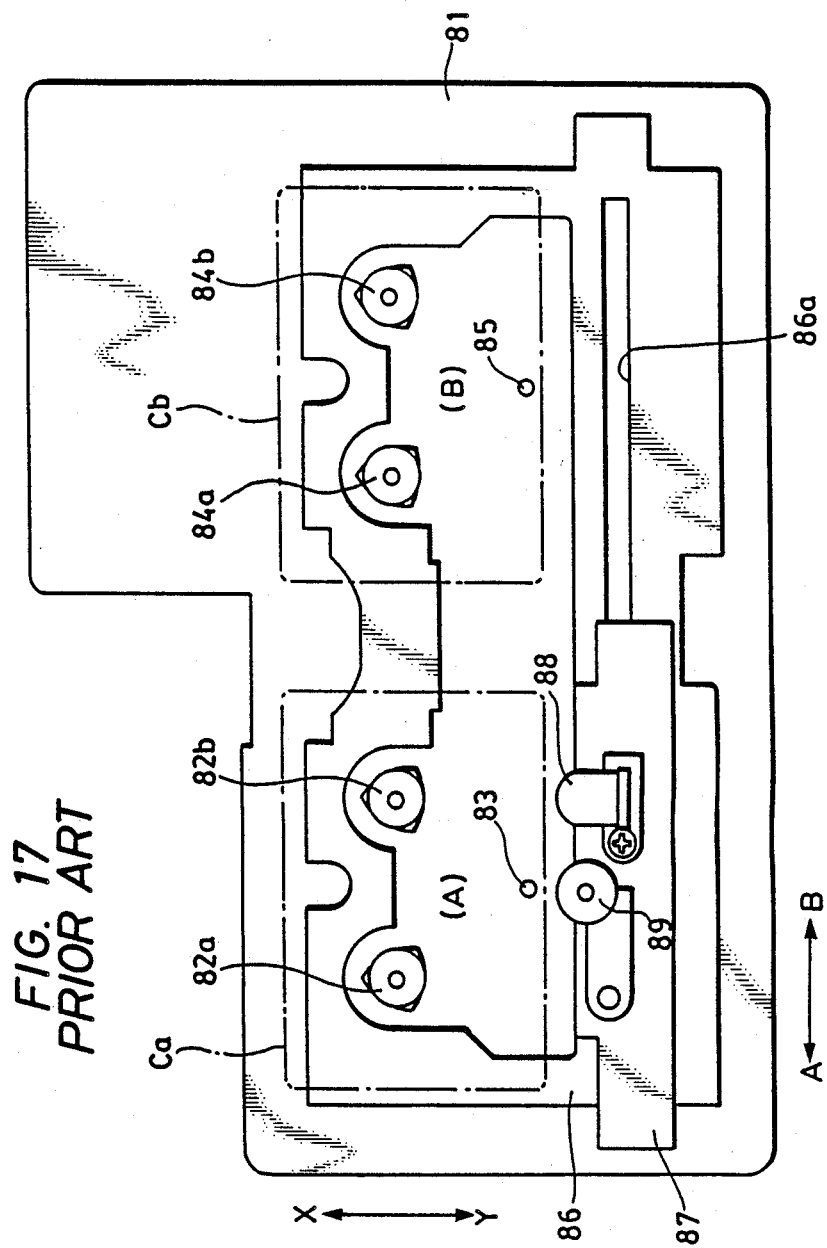
FIG. 17 is a plan view of a prior art driving unit of a double-cassette tape player.

As shown in FIG. 16(B), when the assist motor M2 is locked (the motor cannot rotate although supplied with a current), a current higher than a normal current (hereinafter called "lock current") flows in the motor also after the starting current drops. The lock current flow continues unless the motor is stopped or starts its normal rotation. In the circuit of FIG. 15, a current value AL causing a base-emitter voltage for changing the transistor Tr1 to "ON" is lower than the lock current shown in FIG. 16(B) and higher than a normal current for a normal rotation of the motor shown in FIG. 16(A). Therefore, as far as the lock current. flows, the transistor Tr1 maintains "ON" continuously from the starting time. Further, a time TL required for elevating the input gate TP2 to 2.5 V under the time constant defined by the capacitor Co and the resistor R3 is sufficiently longer than the maximum value of a time required for a normal mode changing, i.e. a time T required for a transfer from the recording/reproducing mode of the left-hand cassette receiving area (A) to the recording-/reproducing mode of the right-hand cassette receiving area (B) (see FIG. 16(A)).

Therefore, when the assist motor M2 falls in a locked condition, the lock current larger then AL flows in the resistor Ro continuously, and a high voltage continues between the base and the emitter of the transistor TR1 to forcibly maintain "ON" condition of the transistor Tr1. Therefore, a responsive signal changes the transistor Tr2 into "ON", and the inverter output of the IC1 continues "1". Then the voltage of the input gate TP2 of the IC2 begins to rise due to a charging of the capacitor Co. Under the time constant defined by the capacitor Co and the resistor R3, the input gate TP2 reaches 2.5 V only after the time TL. Concurrently, the inverter output TP3 of the IC2 becomes "0". More specifically, the lock current larger than AL flows caused by the lock of the motor, and when this flow lasts longer than the time TL, the locked condition is detected, and an abnormal signal "0" is applied to the CPU 75.

Figure 14:
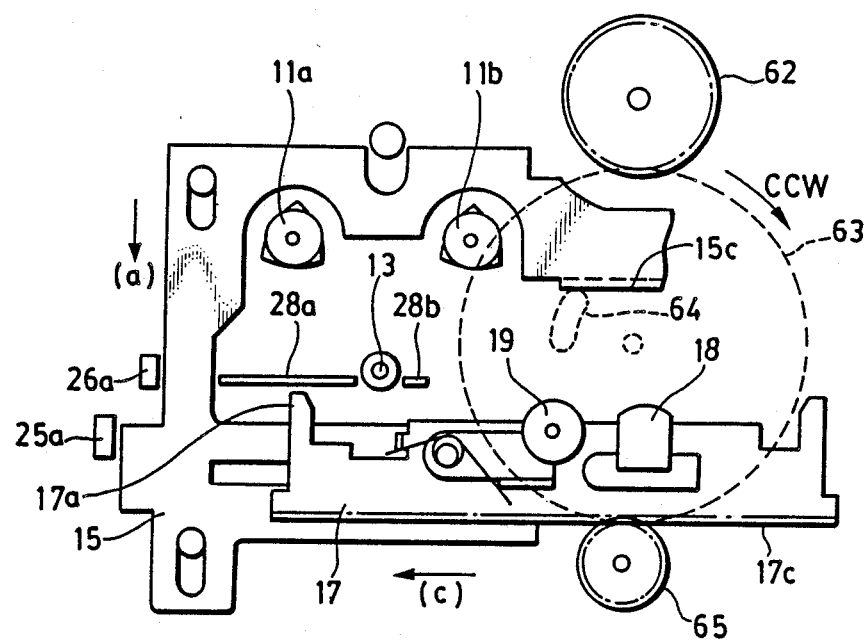

As shown in FIG. 3, the head base driving gear 65 has a slip mechanism including the felt 65c. Therefore, if an external force forcibly moves the head base 17 or if a large impulse causes an abnormal slip of the slip mechanism, a relative displacement may occur between the change gear 63 and the head base 17. As explained above, since the detection of each mode is effected by the detection plate 70 provided on the change gear 63, such an abnormal slip may cause a large error between a detection of the detection pattern of the detection plate 70 and an actual position of the head base 17. FIG. 14 shows an example of such abnormal conditions. This drawing shows that a slip of the head base driving gear 65 causes a rightward displacement of the head base 17 from its normal position. Assume here that a user attempts to change the cassette C1 in the left-hand cassette receiving area (A) into the recording/reproduction mode in the illustrated abnormal condition. When the change gear 63 is properly rotated to the angle of FIG. 4, the head base 17 must fully moves in the (c) direction. However, the abnormal slip causes the head base 17 to remain in a halfway position in the movement in the (c) direction. However, since the change gear 63 is at the angle (b) of FIG. 10, it is judged by the pattern of the detection plate 70 and the detection levels of the two detectors 71 and 72 that the head base 17 has moved to the full extent in the (c) direction. Responsively, the change gear 63 is driven in the CCW direction, and the driving cam 64 starts to drive the slide member 15 in the (b) direction. However, when the head base 17 has not moved fully in the (c) direction, the left end guide projection 17a engages the aforegoing stopper 28a, and the slide member 15 cannot move further. This is the locked condition of the assist motor M2. Therefore, the lock current shown in FIG. 16(B) flows in the assist motor M2, and the motor current flows for a longer time than the detection time TL because no mode detection is effected due to the stop of the change gear 63. As a result, an abnormal signal "0" is entered in the CPU 75 in the circuit of FIG. 15. Responsively the CPU 75 interrupts the present mode changing program and forcibly transfers to an unlocking and correcting program. According to the program, the assist motor M2 is first rotated reversely in the CW direction to disengage the driving cam 64 from the slide member 15. The assist motor M2 is further rotated in the CW direction to move the head base 17 in the (d) direction via the head base driving gear 65. The head base 17 stops after its right margin engages the stopper 25b. As a result, a subsequent rotation of the change gear 63 in the CW direction causes a relative slip between the upper gear 65a and the lower gear 65b of the head base driving gear 65 so as to remove the former abnormal slip therebetween. When the change gear 63 is further rotated in the CW direction, the driving cam 64 engages the slide member 15 and subsequently drives same in the (b) direction. At this time, the head base 17 is free from the stopper 28a through 28d, and moves together in the (b) direction. As a result, the cassette C1 in the right-hand cassette receiving area (B) restores the same condition as the recording or reproducing mode. Thus the returning operation is completed, and the head base 17 and the change 63 restore their proper relative positions. After this, the system is changed to an originally desired mode under an instruction from the CPU 75.

Although the illustrated embodiment uses a pattern which is optically detected, it may be replaced by a magnetically detected pattern or a conductive pattern to be detected by a slide contact.

Although the illustrated embodiment uses a single pinch roller 19 located on the head base 17, two pinch rollers may be provided in the respective cassette receiving areas (A) and (B) so that the head base 17, when driven in the (b) direction, urges one of the pinch rollers against an associated capstan.

The illustrated embodiment is configured to receive microsize cassettes. However, the invention may be arranged to receive normal size cassettes by minor changes in the locations of the magnetic head and the capstans.

As described above, the invention uses a detection pattern having changing points of detection levels at identical angular positions of forward and reverse rotations of the change gear, and the detection pattern is arranged to provide different combinations of changes in detection levels by a pair of detectors upon forward and reverse rotations of the change gear. Therefore, the system can acknowledge reliably at a precise timing toward which of the first and second cassette receiving areas the head base is moving. This enables a precise control in establishment of a selected mode. Further, this also ensures a reliable initializing operation.

Additionally, since the slide member cannot move to a position for the recording or reproducing mode unless the head base moves to a position opposed to either cassette receiving area, if a user attempts to forcibly establish the recording or reproducing mode of either cassette receiving area when the head base is displaced by the slip mechanism, the slide member is necessarily locked. Since the locked condition is electrically detected by a current to the assist motor, the returning circuit is immediately activated to return the system to its original proper configuration.

What is claimed is:

1. In a double-cassette tape player including first and second cassette receiving areas each having reel bases and a capstan and both loaded with cassettes thereon in alignment so as to face their tape-exposed portions in the same direction; a slide member extending to the full length between both said cassette receiving areas; a head base supporting a magnetic head thereon and provided on said slide member for alternative reciprocal movement to positions opposed to said tape-exposed portions of said cassettes; and a changed gear driven by a motor in forward and reverse directions to transmit its rotating power to a rack of said head base via a slip mechanism, said change gear having a cam which urges said slide member toward one of said cassette receiving areas after said head base moves to one of said positions opposed to said tape-exposed portions of said cassettes, an improvement further including a mode detection apparatus consisting of a detection pattern provided on said change gear and a pair of detectors opposed to said detection pattern, said detection pattern having a configuration satisfying the following conditions (a) through (c):

(a) detected points detected by said detectors being common in whichever direction toward said first cassette receiving area or toward said second cassette receiving area said head base is moving when said slide member is lifted up toward said cassette receiving areas by said cam of said change gear, (b) a detection level changing point upon a forward rotation of said change gear and a detection level changing point upon a reverse rotation of said change gear being located at identical angular positions with respect to said common detection point in (a) above, and (c) combinations of detection point in (a) above, and (c) combinations of detection level changes of said detectors being different between those upon a forward rotation of said change gear and those upon a reverse direction of said change gear as far as said detection level changing points of (b) above are concerned.

2. In a double-cassette tape player including first and second cassette receiving areas each having reel bases and a capstan and both loaded with cassettes thereon in alignment so as to face their tape-exposed portions in the same direction; a slide member extending to the full length between both said cassette receiving areas; a head base supporting a magnetic head thereon and provided on said slide member for alternative reciprocal movement to positions opposed to said tape-exposed portions of said cassettes; and a change gear driven by a motor in forward and reverse directions to transmit its rotating power to a rack of said head base via a slip mechanism, said change gear having a cam which urges said slide member toward one of said cassette receiving areas after said head base moves to one of said positions opposed to said tape-exposed portions of said cassettes, an improvement further including a mode detection apparatus consisting of a detection pattern provided on said change gear and a pair of detectors opposed to said detection pattern; a stopper member configured to prevent a movement of said slide member toward one of said cassette receiving areas against an urging force of said cam of said change gear in the same direction when said head base cannot move fully toward said cassette receiving area due to a relative displacement between said change gear and said head base caused by a slip of said slip mechanism; a detection circuit for measuring the value and the lasting time of a lock current flowing in said motor for driving said change gear when said stopper member prevents a movement of said motor in the opposite direction when said value and said lasting time of said lock current both exceed predetermined values.

* * * * *